United States Patent
Bernard et al.

(10) Patent No.: US 7,630,534 B2
(45) Date of Patent: Dec. 8, 2009

(54) METHOD FOR RADIOLOGICAL IMAGE PROCESSING

(75) Inventors: Sylvain Bernard, Le Bretonneux (FR); Serge Muller, Guyancourt (FR); Xavier Bouchevreau, Issy les Moulineaux (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 932 days.

(21) Appl. No.: 10/999,874

(22) Filed: Nov. 30, 2004

(65) Prior Publication Data

US 2005/0135695 A1 Jun. 23, 2005

(30) Foreign Application Priority Data

Dec. 10, 2003 (FR) .................. 03 14457

(51) Int. Cl.
*G06K 9/00* (2006.01)
(52) U.S. Cl. ...................... 382/132; 382/260
(58) Field of Classification Search .................. 382/132
See application file for complete search history.

(56) References Cited

U.S. PATENT DOCUMENTS

| | | | | |
|---|---|---|---|---|
| 4,769,850 A * | 9/1988 | Itoh et al. | ................ | 382/132 |
| 5,627,907 A | 5/1997 | Gur et al. | | |
| 5,633,511 A * | 5/1997 | Lee et al. | ................ | 250/587 |
| 5,799,100 A * | 8/1998 | Clarke et al. | ................ | 382/132 |
| 5,825,936 A * | 10/1998 | Clarke et al. | ................ | 382/261 |
| 5,999,639 A * | 12/1999 | Rogers et al. | ................ | 382/132 |
| 6,064,768 A | 5/2000 | Chin et al. | | |
| 6,075,878 A * | 6/2000 | Yoshida et al. | ................ | 382/132 |
| 6,091,841 A * | 7/2000 | Rogers et al. | ................ | 382/132 |
| 6,115,488 A * | 9/2000 | Rogers et al. | ................ | 382/132 |
| 6,137,898 A * | 10/2000 | Broussard et al. | ................ | 382/132 |
| 6,167,146 A * | 12/2000 | Rogers et al. | ................ | 382/132 |
| 6,205,236 B1 * | 3/2001 | Rogers et al. | ................ | 382/132 |
| 6,389,157 B2 * | 5/2002 | Rogers et al. | ................ | 382/132 |
| 6,556,699 B2 * | 4/2003 | Rogers et al. | ................ | 382/132 |
| 6,650,766 B1 * | 11/2003 | Rogers et al. | ................ | 382/132 |
| 6,757,415 B1 * | 6/2004 | Rogers et al. | ................ | 382/130 |
| 6,763,128 B1 * | 7/2004 | Rogers et al. | ................ | 382/130 |
| 6,801,645 B1 * | 10/2004 | Collins et al. | ................ | 382/130 |
| 6,970,587 B1 * | 11/2005 | Rogers | ................ | 382/132 |
| 7,298,877 B1 * | 11/2007 | Collins et al. | ................ | 382/128 |
| 7,308,126 B2 * | 12/2007 | Rogers et al. | ................ | 382/132 |
| 7,519,206 B2 * | 4/2009 | Mulet-Parada et al. | ...... | 382/128 |

(Continued)

FOREIGN PATENT DOCUMENTS

EP 0 609 922 A 8/1994

(Continued)

OTHER PUBLICATIONS

Gonzalez, R.C., Woods, R.E., "Digital Image Processing", 2nd Ed., 2002, ISBN: 0-201-18075-8.*

(Continued)

*Primary Examiner*—Sath V Perungavoor
(74) *Attorney, Agent, or Firm*—Global Patent Operation (57) ABSTRACT

A method for radiological image processing that includes: locating, on a radiological image provided by an imaging device, elements that may constitute signs of micro-calcification and displaying an image on which the intensity of elements thus localized is enhanced.

27 Claims, 2 Drawing Sheets

U.S. PATENT DOCUMENTS

2002/0181797 A1* 12/2002 Young ........................ 382/260
2006/0083418 A1*  4/2006 Watson et al. ............... 382/133
2008/0267474 A1* 10/2008 Chen et al. .................. 382/130

FOREIGN PATENT DOCUMENTS

| EP | 0 627 695 A | 12/1994 |
| EP | 1 113 392 B1 | 8/2004 |
| WO | WO 00/79474 A | 12/2000 |

OTHER PUBLICATIONS

Unser et al., "B-Spline Signal Processing: Part II Efficient Design and Applications", IEEE Trans. on Signal Processing, Feb. 1, 1993, p. 834-848.

Unser et al, "On the Asymtopic Convergence of B-Spline Wavelets to Gabor Functions", IEEE Trans. Information Theory, vol. 38, No. 2, Mar. 1992, pp. 864-872.

Unser, "Fast Gabor-Like Windowed Fourier and Continuous Wavelet Transforms", IEEE Signal Processing Letters, vol. 1, No. 5, May 1994, pp. 76-79.

* cited by examiner

FIG_1

FIG_2A

FIG_2B

FIG_3

FIG_4A

FIG_4B

METHOD FOR RADIOLOGICAL IMAGE PROCESSING

CROSS-REFERENCE TO RELATED APPLICATIONS

This application claims the benefit of a priority under 35 USC 119(a)-(d) to French Patent Application No. 03 14457 filed Dec. 10, 2003, the entire contents of which are hereby incorporated by reference.

BACKGROUND OF THE INVENTION

This invention relates to the field of radiological imaging and, more specifically, an object of interest particularly in the field of mammography. Mammography is largely used for detecting lesions and preventing breast cancer. The first signs that radiologists search for on mammogram images are calcium deposits called micro-calcifications, which generally constitute more opaque elements in X-rays than the surrounding tissue. Radiologists scrutinize the images looking for signs of these micro-calcifications. Radiologists can, to a certain degree, differentiate between malignant micro-calcifications (often a group of clusters) and benign calcium deposits. Radiologists interpret the shape and brightness of each individual micro-calcification as well as the shape and extension of the clusters they observe on radiographic images.

Nevertheless, some radiologists do not perceive certain deposits. This phenomenon has several causes. Notably, because mammogram images are the result of projections, they represent superimposed structures that block the visibility of micro-calcifications. Furthermore, radiologists must often analyze several mammography images one after the other, which could lead to eye fatigue that could affect their capacity to perceive clusters.

Computer Assisted Diagnostics (CAD) tools help radiologists in detecting and characterizing lesions. Such a system is, for example, described in U.S. Pat. No. 6,137,898. These CAD systems can process film images that have been previously digitalized using a scanner and detect malignant micro-calcification clusters. These systems indicate the position of clusters on the image using markers such as rectangles or circles, or even arrows, placed around the clusters. The radiologist can select the area thus marked to view in more detail. These systems include algorithms based on characteristic parameters that allow them to automatically distinguish the malignant elements from the benign elements. The inconvenience of these systems is that they tend to replace the radiologist in the interpretation of the image, in particular, in terms of distinguishing between malignant elements and benign elements. Nevertheless, these systems are not sufficiently reliable to completely replace radiologists.

BRIEF DESCRIPTION OF THE INVENTION

An embodiment of the invention is directed to a CAD system to assist a radiologist in detecting micro-calcifications, without replacing the radiologist in the image interpretation stage. An embodiment of the invention is directed to a method of image processing, typically a radiological image, comprising: locating, on an image which may be provided by an imaging device, an element that may constitute a sign of micro-calcification and displaying an image on which the intensity of the element thus localized is enhanced. Each element localized on the radiological image is comprised of a set of connected pixels (or points.).

An embodiment of the method of the invention allows enhancing all the signs of micro-calcification that appear on the image without distinction, whether these signs are grouped or isolated, benign or malignant. Consequently, the radiologist obtains an immediate overall view of the distribution mapping of micro-calcifications. The radiologist can then directly observe the shape and extension of clusters without necessarily needing to zoom to the areas in question.

In all cases, the appreciation of the clinical interest of enhanced signs is left to the radiologist.

In an embodiment of the invention, the enhanced intensity of elements that may constitute micro-calcifications is performed on a "presentation" image that can be viewed by the radiologist and is distinct from the raw image from which the elements are detected. This presentation image can be obtained through other processing methods designed to improve the ease with which the radiologist reads the image.

BRIEF DESCRIPTION OF THE DRAWING

Other characteristics and advantages will be made more evident upon reading the description below, which is provided solely for illustrative, non-limiting purposes and must be read while referring to the attached figures, in which.

DETAILED DESCRIPTON OF THE INVENTION

Figure 1:
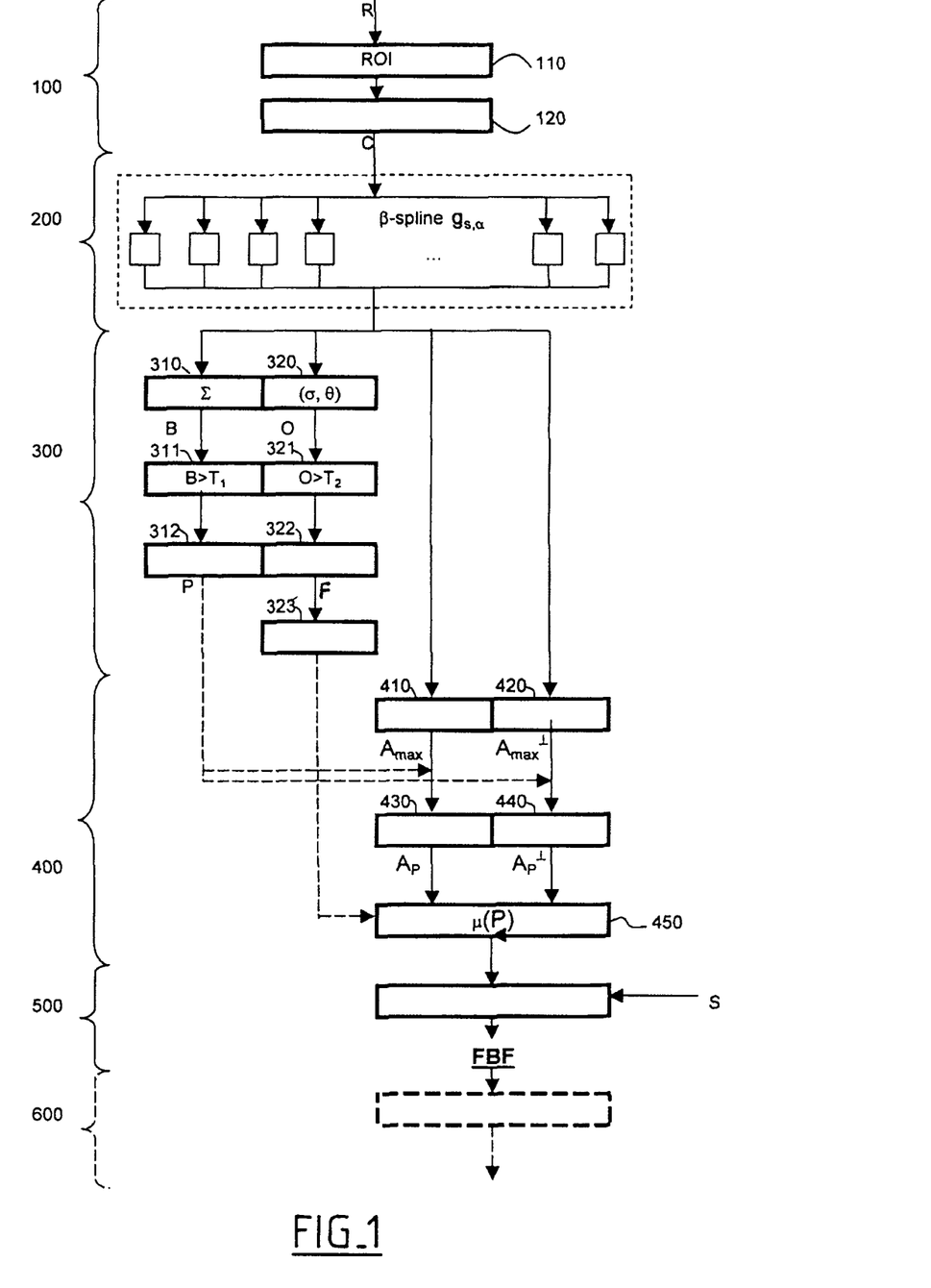
FIG. 1 represents, in the form of a diagram, the various phases and steps of an embodiment of the invention.

An embodiment of the invention is represented in FIG. 1 where the image processing method is applied to a raw image R; that is, it is provided directly by a digital detector of a radiology system without having been pre-processed. It is from this raw image R that the processing method allows locating elements or objects that may constitute signs of micro-calcification.

The processing method also uses an image called a "presentation image" on which the elements will be enhanced in the end. This presentation image S is obtained by another processing method from the raw image R. This method allows providing an image that can be viewed directly by the radiologist. EP 1 113 392 describes, for example, a method for thickness compensation that allows adapting the grey scale variations for displaying an image whose appearance allows performing a reading along the entire extension of the patient's breast.

In FIG. 1, the image processing method may include five phases: (1) a raw image R pre-processing phase 100; (2) an image analysis phase 200; (3) an image segmentation phase 300; (4) a similarity measurement phase 400; and (5) an image summary phase 500, designed to be viewed by the radiologist.

The pre-processing phase 100 comprises converting the raw digital image R directly from the digital detecting device into an image that can be used for subsequent processes. In step 110, the raw image R is reframed over the region of interest (ROI) that is, the region of the image that contains the patient's breast. This step is designed to apply the detection of elements that may constitute signs of micro-calcification only to the region of interest, and thus reduce subsequent processing times. A log function is applied to obtain a radiological thickness cropped image and the local contrast defined at each point is normalized.

In step 120, the raw reframed image is converted into a contrast image C defined for each image pixel as:

$$C(x, y) = -K \frac{R(x, y) - M(x, y)}{M(x, y)} \quad [1]$$

where R(x,y) is the grey scale intensity of the thickness image of the raw image R at pixel (x,y), M(x,y) is the average grey scale intensity calculated in the surrounding area of the pixel (x,y) on the raw image R, and K is a constant. The surrounding area of the pixel (x,y) is, for example, delimited by a window of $(2W+1)^2$ pixels side, where W=4.

The image analysis phase 200 comprises filtering the contrast image C by using a bank of filters. Each filter of the bank is designed to react strongly to the presence of structures that have given size and direction. In phase 200, for each pixel ($x_0$, $y_0$) of the image, a surrounding f' side area $(2W+1)^2$ centered on the pixel ($x_0$, $y_0$) is defined. The f'(x,y) function is considered to represent the grey scale intensity of the contrast image C in the surrounding area of the point ($x_0$, $y_0$):

$$f'(x, y) = N(x_0+x, y_0+y) \text{ with } (x, y) \in [-W, W]^2 \quad [2]$$

Figure 2A:
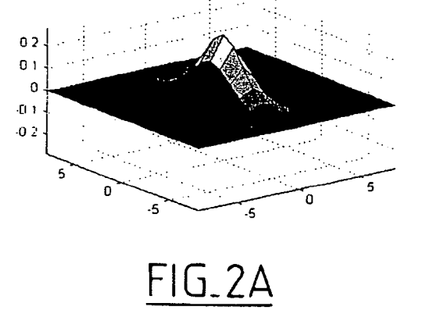
FIGS. 2A and 2B represent examples of β-spline type functions.
Figure 2B:
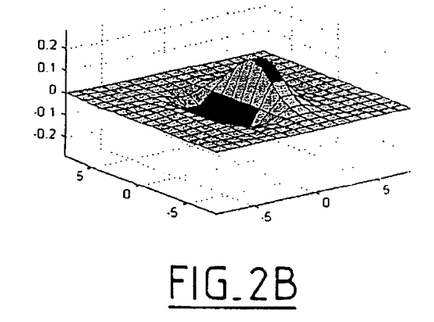

The f' function is then correlated with each of the filters of the bank of filters. These filters can be β-spline wavelet type functions. Examples of β-spline functions are represented in FIGS. 2A and 2B. These functions are described in the following publications: Michael UNSER, Akram ALDOURI & Murray EDEN "On the Asymptotic Convergence of β-spline Wavelets to Gabor Functions," IEEE Transactions on Information Theory, vol. 38, no. 2, pp. 864-872, March 1992; and Michael UNSER, "Fast Gabor-Like Windowed Fourier and Continuous Wavelet Transforms," IEEE Signal Processing Letters. vol. 1, no. 5, pp. 76-79, May 1004. This type of function allows quick filtering and authorizes the convolution in the spatial field. The bank includes, for example, 16 wavelets that have 8 different directions and 2 different scales. For a $g_{s,\alpha}$ wavelet with a scale s and direction α, the following correlation matching factor is obtained:

$$A_{s,\alpha} e^{i-\varphi_{s,\alpha}} = \frac{1}{\|g_{s,\alpha}\|} \cdot \int_{-W}^{W} \int_{-W}^{W} f'(x, y) \cdot g(x, y) \cdot dx \cdot dy \quad [3]$$

with $\|g_{s,\alpha}\| = \sqrt{\int_{-\infty}^{+\infty} \int_{-\infty}^{+\infty} g_{s,\alpha}(t)^2 \cdot dt}$, $\varphi_{s,\alpha} \in [0, 2[$ and $W = 2s$.

The segmentation phase 300 comprises locating, from the filtered images, the elements P comprised of a mass of connected pixels that may constitute signs of micro-calcification. From the filtered images, the following images are generated: an isotropic filtered image B and a directionally oriented filtered image O.

In step 310, the isotropic image B is calculated as the sum of all the filtered images generated by the analysis phase 200. Therefore:

$$B(x, y) = \frac{1}{N} \cdot \sum_{s,\alpha} A_{s,\alpha}(x, y) \cdot \cos(\omega \cdot \cos(\alpha) \cdot x + \omega \cdot \sin(\alpha) \cdot y - \varphi_{s,\alpha}(x, y)) \quad [4]$$

with $$\omega = \frac{\pi}{2s}$$

and N is the number of filters that make up the bank, N=16.

In step 311, a threshold $T_1$ is applied to image B in order to select the pixels that have intensity that is greater than the threshold. This allows only keeping the elements with sufficient intensity in the isotropic filtered image.

In step 312, a connected component-labelling algorithm is applied to the binary image thus obtained in order to extract the masses of interconnected pixels (these masses will also be called particles) whose intensity is greater than threshold $T_1$ in image B. The masses thus selected can constitute signs of micro-calcification.

In step 320, the directionally oriented filtered image O is calculated by applying the filter that presents the most significant response to all the contrast images C. Therefore:

$$O(x, y) = A_{\sigma,\theta}(x, y) \cdot \cos(\omega \cdot \cos(\theta) \cdot x + \omega \cdot \sin(\theta) \cdot y - \varphi(x, y)) \quad [5]$$

with $(\sigma, \theta) = \underset{s,\alpha}{\text{Argmax }} A_{s,\alpha}(x, y)$.

In step 321, a threshold $T_2$ is applied to image O in order to select the pixels with an intensity that is greater than this threshold, which allows only keeping the elements with sufficient intensity.

In step 322, a connected component-labelling algorithm is applied to the binary image thus obtained in order to extract the masses of interconnected pixels (these masses will also be called segments) whose intensity is greater than $T_2$ in image O.

Figure 3:
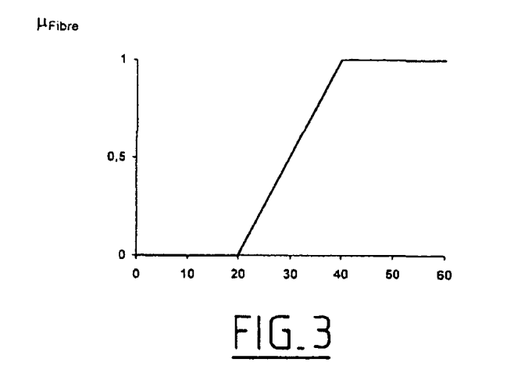
FIG. 3 represents an example of a $\mu_{filter}$ belonging function of a pixel to the "Fiber" class based on the elongation of the segment to which it belongs.

In step 323, determined for each pixel (x,y) of a segment, is the degree to which it belongs to the $\mu_{Fibre}(x,y)$ "fiber" class according to the elongation of the segment to which it belongs. FIG. 3 represents an example of a $\mu_{Fibre}$ belonging function based on the elongation of the segment to which it belongs. Some particles P detected during step 312 are surely signs of micro-calcification, others are probably not. For most of these particles, it is difficult to decide whether they constitute calcium deposits or not.

The similarity measurement phase 400 comprising determining, for each particle P, a $\mu_{calcium}(P)$ parameter that characterises the similarity between the particle and a calcareous sign. This $\mu_{calcium}(P)$ parameter represents the degree to which particle P belongs to the "Calcareous Sign" class. The following two images are generated from the filtered images: an image of maximum amplitudes $A_{max}$ and an image of maximum amplitudes in orthogonal direction $A_{max}^\perp$.

In step 410, the maximum amplitude image $A_{max}$ is calculated by applying the filter with the maximum response to each pixel (x,y) of the contrast image C. Therefore:

$$A_{max}(x, y) = A_{\sigma,\theta}(x, y) \quad [6]$$

with $(\sigma, \theta) = \underset{s,\alpha}{\text{Argmax }} A_{s,\alpha}(x, y)$ In step 420, the maximum amplitude image in orthogonal direction $A_{max}^{195}$ is calculated by applying, to each pixel (x,y) of the contrast image C, the filter with an orthogonal direction $\theta^\perp$ in the direction θ of the filter with the maximum response. Therefore:

$$A_{max}^\perp(x,y) = A_{\sigma\theta^\perp}(x,y) \quad [7]$$

In step 430, from the maximum amplitude image $A_{max}$ obtained in step 410 and for each particle P comprised of a number of n pixels, an $A_p$ parameter is calculated as the average of the maximum amplitudes:

$$A_P = \frac{1}{n} \cdot \sum_{(x,y) \in P} A_{max}(x,y) = \frac{1}{n} \cdot \sum_{(x,y) \in P} \left( \max_{s,\alpha} A_{s,\alpha}(x,y) \right) \quad [8]$$

The $A_p$ parameter indicates the brightness of particle P with respect to its environment.

In step 440, the same calculation is performed from the maximum amplitude image in the orthogonal direction $A_{max}^{\perp}$. A parameter $A_p^{\perp}$ is obtained:

$$A\frac{1}{P} = \frac{1}{n} \cdot \sum_{(x,y) \in P} A\frac{1}{\max}(x,y) \quad [9]$$

Parameter $A_p^{\perp}$ characterises both the brightness and the shape of particle P. The brighter and rounder particle P is, the higher the $A_p^{\perp}$ parameter will be.

In step 450, for each particle P a $\mu_{Calcium}(P)$ parameter is calculated, which characterises the degree to which particle P belongs to the "Calcareous Sign" class. This $\mu_{Calcium}(P)$ parameter is calculated according to the $A_p$ and $A_p^{\perp}$ parameters, as well as the degree to which $\mu_{Fibre}(x_C, y_C)$ of central pixel $(x_C, y_C)$ of particle P belongs to the "Fibre" class determined in step 322. This $\mu_{Calcium}(P)$ parameter thus takes into account the size, shape, and brightness criteria. The more particle P resembles (does not resemble, respectively) a calcareous sign, the larger and closer to 1 (to 0, respectively) the obtained $\mu_{Calcium}(P)$ parameter will be. This $\mu_{Calcium}(P)$ parameter can be obtained by training on a database of images in which proven micro-calcifications have been marked (by using, for example, a decision tree, a neuron network, or support vector machines.).

The summary phase 500 comprises enhancing on the presentation image S the intensity of the pixels that belong to the particles P selected in step 312. For each pixel (x,y) of the presentation image S belonging to a particle P, the pixel intensity is increased with respect to the immediate surroundings intensity. The increase in intensity depends on the similarity of particle P with a calcareous sign. The new FBF (Finding Based Filtration) pixel intensity is calculated as follows:

$$FBF(x,y) = M_S(x,y) + \mu_{Calcium}(P)(S_p(x,y) - M_S(x,y)) \quad [10]$$

where $S_p(x,y)$ is the grey scale of a pixel (x,y) belonging to particle P, $M_S(x,y)$ is the average grey scale of the pixels located in a surrounding area of particle P and not belonging to particle P.

There is:

$$M_S(x,y) = \frac{1}{\#A} \sum_A S(x+k, y+1) \quad [11]$$

where A is the set of image points located at a distance that is less than N pixels (N is normally equal to 5) and not null of particle P and #A is the cardinal number of this set. Particles P are therefore more or less enhanced according to their similarity to a calcareous sign. This allows, in particular, further enhancing the particles for which there is a stronger probability of constituting micro-calcifications.

Figure 4A:
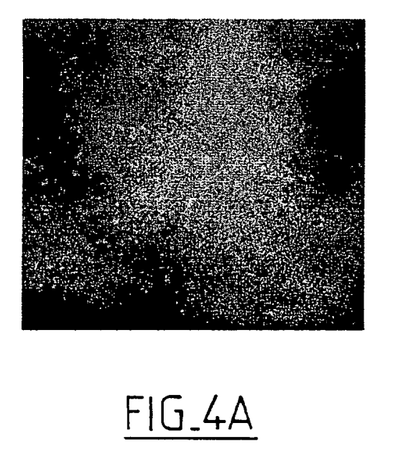
FIGS. 4A and 4B represent, respectively, a presentation image before enhancing and a final presentation image after enhancing the signs of calcium.
Figure 4B:
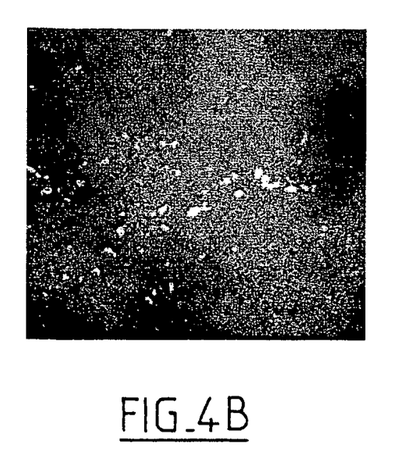

FIGS. 4A and 4B represent, respectively, a presentation image S before enhancing and a final FBF presentation image after enhancing. The final presentation image on which particles P have been enhanced is displayed on a display device in order to be viewed by a radiologist. On this final image, all the calcium signs have been made evident without distinction as to their suspect nature or as to their grouped or isolated nature. Consequently, the radiologist obtains an immediate overall view of the distribution mapping of micro-calcifications. The radiologist can directly observe the extension of these micro-calcifications without necessarily zooming in on the areas in question.

The processing method also includes an optional phase 600 comprising detecting the micro-calcification clusters and having markers available near these clusters and in their surrounding area. The processing method can group the particles that present a high $\mu_{Calcium}(P)$ parameter that characterizes the degree to which they belong to the "Calcareous Sign" class, in clusters of at least 3 particles. The radiologist can choose to enable or disable this marking option. Optionally, a bounded box or a contour can be placed around groups of micro-calcifications.

There are several possible ways of enhancing the intensity of elements. In an embodiment of the invention, the enhanced intensity of elements includes a phase 500 that comprises applying to each point (x, y) of the radiological image belonging to one of these elements P, an amplification factor of the difference in grey scale between this point (x, y) and a set of points (x+k, j+1) located in the surrounding area of point (x, y) that does not belong to the element P in question.

The phase 100 may comprise converting the raw image R into a contrast image C using local standardization of the contrast.

In an embodiment of the invention for each particle, the similarity parameter $\mu_{Calcium}(P)$ is determined as follows: (a) for each of the points (x, y) that forms an element (P): determine a maximum amplitude $A_{max}$ by correlating the intensity of the radiological image in the surrounding area W of the point (x, y) with a filter function $g_{o,\theta}$ leading to a maximum response; and determine a maximum amplitude in orthogonal direction $A_{max}^{\perp}$ by correlating the intensity of the radiological image in the surrounding area W of point (x, y) with the orthogonal direction filter function $g_{o,\theta}^{\perp}$ to the filter function $g_{o,\theta}$ leading to a maximum response; (b) for each element (P): determine a brightness parameter $A_p^{\perp}$ as an average of the maximum amplitudes in orthogonal direction $A_{max}^{\perp}$ on all the points (x, y) of the element P; and obtain from this a similarity parameter $\mu_{Calcium}(P)$ of the element P to a calcareous sign based on the brightness parameters and/or roundness parameters $A_p, A_p^{\perp}$ as well as the degree to which the central point $(x_C, y_C)$ of the element P belongs to a "fiber" class.

In an embodiment of the invention, the amplification factor applied to the points belonging to a same element is based on a similarity µ parameter of the element with a calcareous sign.

In an embodiment of the invention, the step for locating the elements includes: a step comprising in correlating, for each point of a set of points of the radiological image, the image intensity in the surrounding area of the point with each of the functions of a series of filter functions, to produce filtered images; and a step comprising in selecting, from the filtered images, elements that may constitute signs of micro-calcification.

The filter functions are β-spline type functions. These functions have the advantage of leading to a quick filtering and authorize a convolution in the spatial domain. Therefore, they prevent conversions, notably to the frequency domain.

An embodiment of the invention also relates to a radiological image processing device comprising resources for locating, on a radiological image provided by an imaging device, elements that may constitute signs of micro-calcification and resources for displaying an image on which the intensity of the elements thus located has been enhanced.

One skilled in the art may make or propose various modifications in function and/or way and/or result and/or structure and/or steps in the disclosed embodiments and equivalents thereof without departing from the scope and extant of the invention.

What is claimed is:

1. A method for image processing, the method comprising:
    locating on an image a plurality of points of an element (P) that may constitute an object of interest, the plurality of points having an intensity that is greater than a threshold value;
    displaying an image on which the intensity of one or more of the points of the element (P) thus located is enhanced with respect to the intensity of one or more points of an area surrounding the element (P) but not belonging to the element (P); and
    applying an amplification factor to the intensity of the points of the element P, wherein the amplification is a function of a similarity parameter of the element (P) with a calcareous sign, and wherein for each element (P), the similarity parameter is determined:
    (a) for each of the points of the element (P) by:
        determining a maximum amplitude by correlating the intensity of the image in the surrounding area of the point with a filter function ($g_{\sigma,\theta}$) leading to a maximum response; and
        determining a maximum amplitude in an orthogonal direction by correlating the intensity of the image in the surrounding area of the point with an orthogonal direction filter function to the filter function leading to the maximum response;
    (b) for each element (P) by:
        determining a brightness parameter as an average of the maximum amplitudes in the orthogonal direction on all the points of the element (P); and
        obtaining from this a similarity parameter of the element (P) to a calcareous sign based on one or more of the brightness parameter and a roundness parameter as well as the degree to which a central point of the element (P) belongs to a "fiber" class.

2. The method according to claim 1 wherein the locating of the element (P) is performed on a saved raw digital image.

3. The method according to claim 2 wherein the locating of the element (P) comprises converting the saved raw digital image into a contrast image using local standardization of the contrast.

4. The method according to claim 2 wherein a log function is applied to the saved raw digital image to obtain a thickness cropped image.

5. The method according to claim 3 wherein a log function is applied to the saved raw digital image to obtain a thickness cropped image.

6. The method according to claim 1 wherein locating the element (P) includes:
    correlating, for each point of a set of points of the image, the image intensity in the surrounding area of the point with each of the functions of a series of filter functions, to produce one or more filtered images; and
    selecting, from the filtered images, one or more elements (P) that may constitute the object of interest.

7. The method according to claim 2 wherein locating the element (P) includes:
    correlating, for each point of a set of points of the image, the image intensity in the surrounding area of the point with each of the functions of a series of filter functions, to produce one or more filtered images; and
    selecting, from the filtered images, one or more elements (P) that may constitute the object of interest.

8. The method according to claim 3 wherein locating the element (P) includes:
    correlating, for each point of a set of points of the image, the image intensity in the surrounding area of the point with each of the functions of a series of filter functions, to produce one or more filtered images; and
    selecting, from the filtered images, one or more elements (P) that may constitute the object of interest.

9. The method according to claim 4 wherein locating the element (P) includes:
    correlating, for each point of a set of points of the image, the image intensity in the surrounding area of the point with each of the functions of a series of filter functions, to produce one or more filtered images; and
    selecting, from the filtered images, one or more elements (P) that may constitute the object of interest.

10. The method according to claim 5 wherein locating the element (P) includes:
    correlating, for each point of a set of points of the image, the image intensity in the surrounding area of the point with each of the functions of a series of filter functions, to produce one or more filtered images; and
    selecting, from the filtered images, one or more elements (P) that may constitute the object of interest.

11. The method according to claim 6 wherein the filter functions are β-spline type functions.

12. The method according to claim 7 wherein the filter functions are β-spline type functions.

13. The method according to claim 8 wherein the filter functions are β-spline type functions.

14. The method according to claim 9 wherein the filter functions are β-spline type functions.

15. The method according to claim 10 wherein the filter functions are β-spline type functions.

16. The method according to claim 6 wherein the selection comprises:
    determining an isotropic filtered image defined by a set of points, the intensity of each of these points is the average of the intensities of the corresponding points belonging to the filtered images; and
    obtaining, by applying a threshold and a connected component labelling algorithm to the isotropic filtered image, a set of elements (P) that may constitute the objects of interest.

17. The method according to claim 7 wherein the selection comprises:
    determining an isotropic filtered image defined by a set of points, the intensity of each of these points is the average of the intensities of the corresponding points belonging to the filtered images; and
    obtaining, by applying a threshold and a connected component labelling algorithm to the isotropic filtered image, a set of elements (P) that may constitute the objects of interest.

18. The method according to claim 8 wherein the selection comprises:
- determining an isotropic filtered image defined by a set of points, the intensity of each of these points is the average of the intensities of the corresponding points belonging to the filtered images; and
- obtaining, by applying a threshold and a connected component labelling algorithm to the isotropic filtered image, a set of elements (P) that may constitute the objects of interest.

19. The method according to claim 9 wherein the selection comprises:
- determining an isotropic filtered image defined by a set of points, the intensity of each of these points is the average of the intensities of the corresponding points belonging to the filtered images; and
- obtaining, by applying a threshold and a connected component labelling algorithm to the isotropic filtered image, a set of elements (P) that may constitute the objects of interest.

20. The method according to claim 10 wherein the selection comprises:
- determining an isotropic filtered image defined by a set of points, the intensity of each of these points is the average of the intensities of the corresponding points belonging to the filtered images, and
- obtaining, by applying a threshold and a connected component labelling algorithm to the isotropic filtered image, a set of elements (P) that may constitute the objects of interest.

21. The method according to claim 11 wherein the selection comprises:
- determining an isotropic filtered image defined by a set of points, the intensity of each of these points is the average of the intensities of the corresponding points belonging to the filtered images; and
- obtaining, by applying a threshold and a connected component labelling algorithm to the isotropic filtered image, a set of elements (P) that may constitute the objects of interest.

22. The method according to claim 1 further comprising:
- determining a directionally filtered image by correlating a set of images with a filter function that leads to a maximum response;
- obtaining, by applying a threshold and a connected component labelling algorithm to the directionally filtered image, a set of structures that may constitute fibers; and
- determining the degree to which each point of a structure belongs to a "fiber" class.

23. The method according to claim 1 wherein the intensity of the points of element (P) is enhanced on a presentation image.

24. The method according to claim 1 wherein the amplification factor includes a grey scale difference between each point of element (P) and the points in the surrounding area of the point and not belonging to the element (P).

25. The method according to claim 1 further comprising detecting one or more micro-calcification clusters and placing markers near or around these clusters.

26. A computer apparatus comprising means for carrying out the following steps:
- locating on a first image an element (P) that may constitute an object of interest; and
- displaying a second image on which the intensity of the element (P) thus localized is enhanced, wherein the intensity of the element (P) is enhanced with respect to the intensity of the area of the second image that surrounds the element (P); and
- applying an amplification factor to the intensity of the points of the element P, wherein the amplification is a function of a similarity parameter of the element (P) with a calcareous sign, and wherein for each element (P), the similarity parameter is determined:
  (a) for each of the points of the element (P) by:
    - determining a maximum amplitude by correlating the intensity of the image in the surrounding area of the point with a filter function ($g_{o,\theta}$) leading to a maximum response; and
    - determining a maximum amplitude in an orthogonal direction by correlating the intensity of the image in the surrounding area of the point with an orthogonal direction filter function to the filter function leading to the maximum response;
  (b) for each element (P) by:
    - determining a brightness parameter as an average of the maximum amplitudes in the orthogonal direction on all the points of the element (P); and
    - obtaining from this a similarity parameter of the element (P) to a calcareous sign based on one or more of the brightness parameter and a roundness parameter as well as the degree to which a central point of the element (P) belongs to a "fiber" class.

27. A computer program comprising code stored on a computer-readable medium that when executed on a computer causes the computer to perform:
- locating on an image a plurality of points of an element (P) that may constitute an object of interest, the plurality of points having an intensity that is greater than a threshold value; and
- displaying an image on which the intensity of one or more of the points of the element (P) thus located is enhanced with respect to the intensity of one or more points of an area surrounding the element (P) but not belonging to the element (P); and
- applying an amplification factor to the intensity of the points of the element P, wherein the amplification is a function of a similarity parameter of the element (P) with a calcareous sign, and wherein for each element (P), the similarity parameter is determined;
  (a) for each of the points of the element (P) by:
    - determining a maximum amplitude by correlating the intensity of the image in the surrounding area of the point with a filter function ($g_{o,\theta}$) leading to a maximum response; and
    - determining a maximum amplitude in an orthogonal direction by correlating the intensity of the image in the surrounding area of the point with an orthogonal direction filter function to the filter function leading to the maximum response;
  (b) for each element (P) by:
    - determining a brightness parameter as an average of the maximum amplitudes in the orthogonal direction on all the points of the element (P); and
    - obtaining from this a similarity parameter of the element (P) to a calcareous sign based on one or more of the brightness parameter and a roundness parameter as well as the degree to which a central point of the element (P) belongs to a "fiber" class.

* * * * *

UNITED STATES PATENT AND TRADEMARK OFFICE
CERTIFICATE OF CORRECTION

PATENT NO. : 7,630,534 B2  Page 1 of 1
APPLICATION NO. : 10/999874
DATED : December 8, 2009
INVENTOR(S) : Bernard et al.

It is certified that error appears in the above-identified patent and that said Letters Patent is hereby corrected as shown below:

In Column 4, Line 63, delete "$A_{max}^{195}$" and insert -- $A_{max}^{\perp}$ --, therefor.

In Column 4, Line 67, in Eq. "[7]", delete " $=A_{\sigma\theta}^{\perp}(x,y)$ " and insert -- $= A_{\sigma,\theta}^{\perp}(x,y)$ --, therefor.

In Column 5, Lines 18-20, Eq. "[9]", should read -- $A_p^{\perp} = \frac{1}{n} \cdot \sum_{(x,y)\in P} A_{max}^{\perp}(x,y)$ --.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,630,534 B2  Page 1 of 1
APPLICATION NO. : 10/999874
DATED : December 8, 2009
INVENTOR(S) : Bernard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1377 days.

Signed and Sealed this

Second Day of November, 2010

David J. Kappos
*Director of the United States Patent and Trademark Office*